United States Patent
Huang et al.

(10) Patent No.: US 10,713,493 B1
(45) Date of Patent: Jul. 14, 2020

(54) 4D CONVOLUTIONAL NEURAL NETWORKS FOR VIDEO RECOGNITION

(71) Applicant: Shenzhen Malong Technologies Co., Ltd., Shenzhen (CN)

(72) Inventors: Weilin Huang, Shenzhen (CN); Shiwen Zhang, Shenzhen (CN); Sheng Guo, Shenzhen (CN); Limin Wang, Shenzhen (CN); Matthew Robert Scott, Shenzhen (CN)

(73) Assignee: SHENZHEN MALONG TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/783,400

(22) Filed: Feb. 6, 2020

(51) Int. Cl.
| | | |
|---|---|---|
| *G06K 9/00* | (2006.01) | |
| *G06T 3/00* | (2006.01) | |
| *G06T 7/00* | (2017.01) | |
| *G06N 3/08* | (2006.01) | |
| *G06N 20/10* | (2019.01) | |
| *G06T 7/10* | (2017.01) | |

(52) U.S. Cl.
CPC ..... *G06K 9/00718* (2013.01); *G06K 9/00671* (2013.01); *G06N 3/08* (2013.01); *G06N 20/10* (2019.01); *G06T 3/0087* (2013.01); *G06T 7/0002* (2013.01); *G06T 7/10* (2017.01); *G06T 2207/10016* (2013.01); *G06T 2207/20081* (2013.01); *G06T 2207/20084* (2013.01)

(58) Field of Classification Search
CPC ................ G06K 15/1219; G06T 2211/412
See application file for complete search history.

(56) References Cited

U.S. PATENT DOCUMENTS

| | | | |
|---|---|---|---|
| 2015/0206026 A1* | 7/2015 | Kim | G06K 9/00335 382/170 |
| 2017/0103264 A1* | 4/2017 | Javan Roshtkhari | G06K 9/6215 |
| 2018/0114071 A1* | 4/2018 | Wang | G06K 9/4628 |
| 2018/0173571 A1* | 6/2018 | Huang | G06N 3/08 |
| 2018/0189652 A1* | 7/2018 | Korthikanti | G06N 3/063 |
| 2019/0065208 A1* | 2/2019 | Liu | G06F 9/3822 |
| 2019/0108399 A1* | 4/2019 | Escorcia | G06N 3/0445 |
| 2019/0319868 A1* | 10/2019 | Svennebring | H04L 41/147 |

OTHER PUBLICATIONS

Tang et al., Object Detection in Videos by Short and Long Range Object Linking, Apr. 2019, arXiv:1801.09823v3 [cs.Cv], pp. 1-11.*
(Continued)

*Primary Examiner* — Guillermo M Rivera-Martinez
(74) *Attorney, Agent, or Firm* — Shook, Hardy & Bacon L.L.P.; Charlie Zhao

(57) ABSTRACT

This disclosure includes technologies for video recognition in general. The disclosed system can automatically detect various types of actions in a video, including reportable actions that cause shrinkage in a practical application for loss prevention in the retail industry. The temporal evolution of spatio-temporal features in the video are used for action recognition. Such features may be learned via a 4D convolutional operation, which is adapted to model low-level features based on a residual 4D block. Further, appropriate responses may be invoked if a reportable action is recognized.

20 Claims, 6 Drawing Sheets

(56) References Cited

OTHER PUBLICATIONS

Joao Carreira and Andrew Zisserman. Quo vadis, action recognition? A new model and the kinetics dataset. In CVPR, pp. 4724-4733. IEEE Computer Society, 2017.
Jeffrey Donahue, Lisa Anne Hendricks, Sergio Guadarrama, Marcus Rohrbach, Subhashini Venu-gopalan, Kate Saenko, and Trevor Darrell. Long-term recurrent convolutional networks for visual recognition and description. In CVPR, pp. 2625-2634, 2015.
Alexey Dosovitskiy, Philipp Fischer, Eddy Ilg, Philip Hawser, Caner Hazirbas, Vladimir Golkov, Patrick van der Smagt, Daniel Cremers, and Thomas Brox. Flownet: Learning optical flow with convolutional networks. In ICCV, pp. 2758-2766. IEEE Computer Society, 2015.
Christoph Feichtenhofer, Haoqi Fan, Jitendra Malik, and Kaiming He. Slowfast networks for video recognition. CoRR, abs/1812.03982, 2018.
Raghav Goyal, Samira Ebrahimi Kahou, Vincent Michalski, Joanna Materzynska, Susanne Westphal, Heuna Kim, Valentin Haenel, Ingo Friind, Peter Yianilos, Moritz Mueller-Freitag, Florian Hoppe, Christian Thurau, Ingo Box, and Roland Memisevic. The "something something" video database for learning and evaluating visual common sense. In ICCV, pp. 5843-5851. IEEE Computer Society, 2017.
Kaiming He, Xiangyu Zhang, Shaoqing Ren, and Jian Sun. Deep residual learning for image recognition. In CVPR, pp. 770-778. IEEE Computer Society, 2016.
Bergey Ioffe and Christian Szegedy. Batch normalization: Accelerating deep network training by reducing internal covariate shift. In ICML, vol. 37 of JMLR Workshop and Conference Proceedings, pp. 448-456. JMLR.org, 2015.
Shuiwang Ji, Wei Xu, Ming Yang, and Kai Yu. 3d convolutional neural networks for human action recognition. IEEE Transactions on Pattern Analysis and Machine Intelligence, 35:221-231, 2010.
Colin Lea, Rene Vidal, Austin Reiter, and Gregory D. Hager. Temporal convolutional networks: A unified approach to action segmentation. In ECCV Workshops (3), vol. 9915 of Lecture Notes in Computer Science, pp. 47-54, 2016.
Xingyu Liu, Joon-Young Lee, and Hailin Jin. Learning video representations from correspondence proposals. CoRR, abs/1905.07853, 2019.
Vinod Nair and Geoffrey E. Hinton. Rectified linear units improve restricted boltzmann machines. In ICML, pp. 807-814. Omnipress, 2010.
Joe Yue-Hei Ng, Matthew Hausknecht, Sudheendra Vijayanarasimhan, Oriol Vinyals, Rajat Monga, and George Toderici. Beyond short snippets: Deep networks for video classification. In CVPR, pp. 4694-4702, 2015.
A. J. Piergiovanni and Michael S. Ryoo. Representation flow for action recognition. CoRR, abs/1810.01455, 2018.

Zhaofan Qiu, Ting Yao, and Tao Mei. Learning spatio-temporal representation with pseudo-3d residual networks. 2017 IEEE International Conference on Computer Vision (ICCV), pp. 5534-5542, 2017.
Karen Simonyan and Andrew Zisserman. Two-stream convolutional networks for action recognition in videos. In NIPS, pp. 568-576, 2014.
Shuyang Sun, Zhanghui Kuang, Lu Sheng, Wanli Ouyang, and Wei Zhang. Optical flow guided feature: A fast and robust motion representation for video action recognition. In CVPR, pp. 1390-1399. IEEE Computer Society, 2018.
Du Tran, Lubomir D. Bourdev, Rob Fergus, Lorenzo Torresani, and Manohar Paluri. Learning spatiotemporal features with 3d convolutional networks. In ICCV, pp. 4489-4497. IEEE Computer Society, 2015.
Limin Wang, Yuanjun Xiong, Zhe Wang, Yu Qiao, Dahua Lin, Xiaoou Tang, and Luc Van Gool. Temporal segment networks: Towards good practices for deep action recognition. In ECCV (8), vol. 9912 of Lecture Notes in computer Science, pp. 20-36. Springer, 2016.
Limin Wang, Wei Li, Wen Li, and Luc Van Gool. Appearance-and-relation networks for video classification. In CVPR, pp. 1430-1439. IEEE Computer Society, 2018a.
Xiaolong Wang and Abhinav Gupta. Videos as space-time region graphs. In ECCCV (5), vol. 11209 of Lecture Notes in Computer Science, pp. 413-431. Springer, 2018.
Xiaolong Wang, Ross B. Girshick, Abhinav Gupta, and Kaiming He. Non-local neural networks. In CVPR, pp. 7794-7803. IEEE Computer Society, 2018b.
Saining Xie, Chen Sun, Jonathan Huang, Zhuowen Tu, and Kevin Murphy. Rethinking spatiotemporal feature learning: Speed-accuracy trade-offs in video classification. In ECCV (15), vol. 11219 of Lecture Notes in Computer Science, pp. 318-335. Springer, 2018.
Kaiyu Yue, Ming Sun, Yuchen Yuan, Feng Zhou, Errui Ding, and Fuxin Xu. Compact generalized non-local network. In NeurIPS, pp. 6511-6520, 2018.
Bowen Zhang, Limin Wang, Zhe Wang, Yu Qiao, and Hanli Wang. Real-time action recognition with enhanced motion vector CNNs. In CVPR, pp. 2718-2726, 2016.
Yue Zhao, Yuanjun Xiong, and Dahua Lin. Trajectory convolution for action recognition. In NeurIPS, pp. 2208-2219, 2018.
Bolei Zhou, Alex Andonian, Aude Oliva, and Antonio Torralba. Temporal relational reasoning in videos. In ECCV (1), vol. 11205 of Lecture Notes in Computer Science, pp. 831-846. Springer, 2018.
Mohammadreza Zolfaghari, Kamaljeet Singh, and Thomas Brox. ECO: efficient convolutional network for online video understanding. In ECCV (2), vol. 11206 of Lecture Notes in Computer Science, pp. 713-730. Springer, 2018.

* cited by examiner

4D CONVOLUTIONAL NEURAL NETWORKS FOR VIDEO RECOGNITION

BACKGROUND

Retail shrinkage or shrinkage means there are fewer items in stock than the inventory list, e.g., due to theft or bookkeeping errors. Shrinkage reduces profits for retailers, which may lead to increased prices for consumers to make up for the lost profit.

Shoplifting has traditionally been attributed as a top cause of retail shrinkage. To collect evidence for shoplifting, surveillance cameras are ubiquitously installed in stores. However, to prevent shoplifting in real time, significant human resources are required to monitor the video footage from the surveillance cameras, which is usually unpractical for smaller retailers, such as convenience stores. Further, even skilled security personnel cannot focus on different monitors simultaneously or uninterrupted for long due to limited perceptual span and attention span.

A technical solution is needed for automated video recognition in various industries for various tasks, including surveillance related tasks, such as recognizing shoplifting or other actions in a video. In this way, retailers can focus on customer services instead of shrinkage.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, aspects of this disclosure include a technical application for digital video analysis or enhancement, including detecting various types of actions in a video. To do that, the disclosed system is to recognize an action in a video based on the temporal evolution of spatio-temporal features in the video, which may be learned based on the technical characteristics of a 4D convolutional operation in one or more neural networks. The 4D convolutional operation can model low-level features based on a residual 4D block. The low-level features include both short-range and long-range temporal structural features in relevant video frames. Accordingly, the disclosed technical application can classify actions in the video based on low-level features. Further, the disclosed technical application is configured to launch appropriate responses based on the recognized action in the video.

In various aspects, systems, methods, and computer-readable storage devices are provided to improve a computing system's ability for video recognition in general. Specifically, one aspect of the technologies described herein is to improve a computing system's ability for RGB-based video recognition, including recognizing and reporting a type of reportable action of a moving object in a RGB-based video. Another aspect of the technologies described herein is to improve a computing system's ability to model or represent the temporal evolution of spatio-temporal features of a video based on 4D convolutional operations. Yet another aspect of the technologies described herein is to improve a computing system's ability to perform various functions or other practical applications in response to the recognized action in the video, as discussed in the DETAILED DESCRIPTION.

BRIEF DESCRIPTION OF THE DRAWINGS

The technologies described herein are illustrated by way of example and not limited in the accompanying figures in which like reference numerals indicate similar elements and in which.

DETAILED DESCRIPTION

Figure 1:
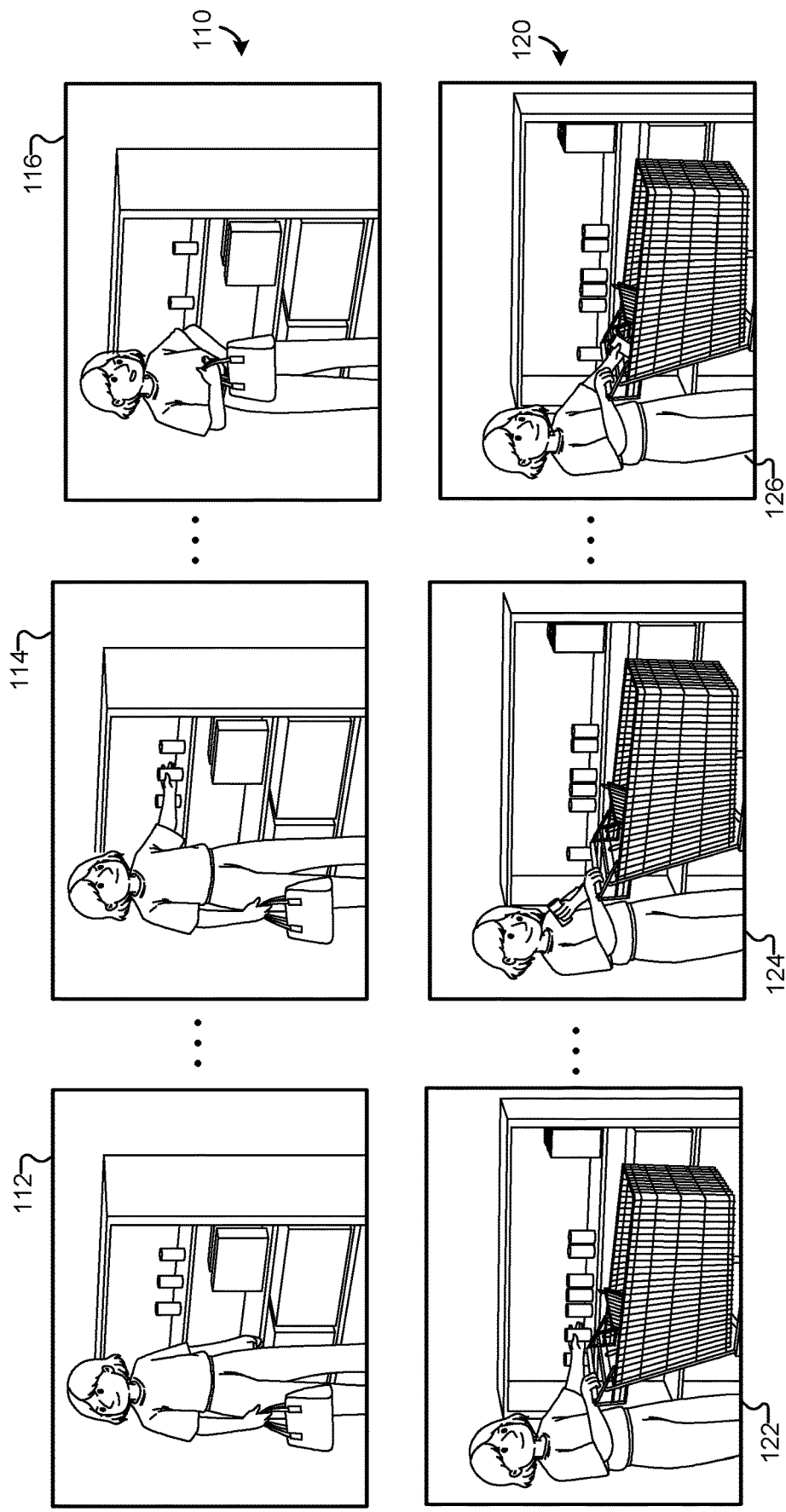
FIG. 1 is a schematic representation illustrating exemplary actions in a video, in accordance with at least one aspect of the technologies described herein.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent condition is used in performing the precedent action.

The profit margin of a particular industry is often limited. An effective strategy for the retail industry to increase or maintain the profit margin is reducing labor costs and preventable losses. However, the two sides of this strategy may be at odds with each other because conventional solutions for loss-prevention usually demand additional labor costs.

Self-checkout machines and cashier-less retail stores have become increasingly popular for various kinds of retailers to reduce labor costs. Self-checkout, also known as self-service checkout, is an alternative to the traditional cashier-staffed checkout, where self-checkout machines are provided for customers to process their own purchases from a retailer. On the other hand, a cashier-less retail store may be partially automated to enable customers to purchase products without being checked out by a cashier or even using a self-checkout machine. However, both self-checkout and cashier-less are generally more vulnerable for shrinkage than traditional cashier-staffed checkout.

A preventable loss for retailers usually is caused by deliberate or inadvertent human actions, known as shrinkage. The majority of preventable loss in retail is caused by deliberate human actions. Inadvertent human actions, such as poorly executed business processes, may be mitigated by enacting or improving employee training and customer education. However, direct interventions are usually required to stop deliberate human actions, such as abuse, fraud, theft, vandalism, waste, or other misconduct. Studies suggest that a great proportion of shoppers are tempted to commit aforementioned deliberate human actions due to the relative ease of doing so in the self-checkout or cashier-less environment.

Retail loss prevention is geared towards the elimination of preventable losses. Traditional approaches to retail loss prevention are typically implemented via electronic article surveillance (EAS) systems and human surveillance, e.g., via closed circuit television (CCTV). EAS is a technological method for preventing unauthorized removal of products from retail stores by fixing special tags (e.g., magnetic tags) to products. However, such tags may be intentionally removed by shoplifters to defeat the EAS technology. As a supplemental security measure, human surveillance may be adopted to deter deliberate human actions. Human surveillance includes observations within an observer's direct view, or from a distance by means of electronic equipment, such as CCTV. However, loss prevention personnel, including uniformed or plain-clothed security for human surveillance, requires significant labor costs. Further, a human's attention span is limited. Attention span is the amount of concentrated time a person can spend on a task without becoming distracted. Even a skilled loss prevention agent cannot focus on different customers or monitors simultaneously or uninterrupted for long due to limited perceptual span and attention span. Meanwhile, the fear of making mistakes (e.g., false positive) can be stressful for loss prevention personnel because bad stops against an innocent business patron may cause dire consequences, including customer dissatisfaction, tarnished business reputation, civil lawsuits, and even criminal prosecution. Resultantly, traditional approaches to retail loss prevention are not only costly but may be ineffective.

To overcome the limitations of traditional systems, the disclosed system is adapted to automatically detect various types of actions in a video, (e.g., deliberate human actions that cause shrinkage). To achieve that, in a high level, the disclosed system is to recognize an action in a video based on the temporal evolution of spatio-temporal features in the video, which may be learned based on the technical characteristics of a 4D convolutional operation in one or more neural networks. The 4D convolutional operation can model low-level features based at least in part on a residual 4D block. The low-level features include both short-range and long-range temporal structural features in relevant video frames. Accordingly, the disclosed system can classify actions in the video based on low-level features. Further, the disclosed technical application is configured to launch appropriate responses based on the recognized action in the video. By way of example, when a reportable action is detected, the disclosed system may send a warning message, including one or more images or video segments relevant to the reportable action, to a designated device to warn a human operator, so the human operator may take appropriate loss-prevention actions. In alternative embodiments, the warning message may be presented to the subject (e.g., a shopper or a cashier) of the reportable action, so the subject may self-correct the issue.

The disclosed video recognition technologies provide technological improvement over the existing video recognition technologies, including conventional two-stream convolutional neural network (CNN) systems, 3D CNN systems, and long-term modeling frameworks.

In a two-stream CNN system, one stream is used for learning from RGB images, and the other one is applied for modeling optical flow. The results produced by the two streams are then fused at later stages, yielding the final prediction. However, the computation of optical flow often takes a rather long time with expensive resource required. Two-stream input and fusion is a general idea to boost the accuracy of various CNN structures. The disclosed system does not use this two-stream architecture.

3D CNN systems provide a simple extension from their 2D counterparts for video representation learning. In a 3D CNN system, a video is treated as a stack of frames, and 3D convolutions are applied directly on the stack of frames. However, 3D CNN systems usually have a larger number of model parameters, which require voluminous training data to achieve reasonable performance, for example, to surpass their 2D counterparts, (e.g., two-stream 2D CNN systems).

Further, 3D CNN systems typically use clip-based methods, which means they only explore a certain part of the video without the consideration of the global or holistic information in the video. Due to practical issues, such as memory consumption and computational cost, 3D CNN systems are mainly used for clip-level feature learning instead of training from the whole video. During training, the clip-based methods randomly sample a short clip (e.g., 32 frames) from the video for representation learning. During testing, they uniformly sample several clips from the whole video in a sliding window manner and calculate the prediction scores for each clip independently. Finally the prediction scores of all clips are simply averaged to yield the video-level prediction. These clip-based models ignore the video-level structure and long-range spatio-temporal dependency during training, and these models only sample a small portion of the entire video. However, it is often hard to accurately recognize action classes with partial observation. Meanwhile, simply averaging the prediction scores of all clips could be sub-optimal during testing. Resultantly, such clip-based models suffer respective deficiencies due to their ignorance of global or holistic information in the video.

In some clip-based methods, self-attention mechanisms have been proposed to model non-local spatio-temporal features. However, such methods are designed for clip-based 3D CNNs. Further, there is no teaching or evidence for incorporating such operations into holistic video representation, and whether such operations can be useful for video-level learning.

Long-term modeling frameworks have been developed to capture more complex structures for video-level representation learning. One representative method in this category operates on a continuous video frame sequence with recurrent neural networks or uses 2D CNNs for frame-level feature extraction. Another representative method models video-level information based on a sparse sampling and aggregation strategy. Frames are sparsely sampled from the whole video and then modelled by the same CNN backbone. Scores are averaged to generate video-level prediction. Due to the simple average aggregation, such long-term modeling frameworks cannot model local information or finer temporal structure. Yet another approach tries to encode an individual representation of video segment with relation networks. Similarly, this approach lacks capacity of capturing local information or finer temporal structure.

The disclosed technologies provide many improvements over conventional technologies. At a high level, the disclosed technologies provide a general and flexible framework for video-level representation learning. This framework models long-range dependency in a more efficient and principled way compared to conventional technologies. The disclosed technologies include a holistic video-level sampling strategy and 4D convolutional interaction. In various embodiments, the video-level sampling strategy is to uniformly sample a sequence of short-term units covering the holistic video. Then a 4D convolutional operation is used to capture inter-clip interaction and enhance its video representation power. In the 4D convolutional operation, video-level 4D convolutional neural networks are used to capture temporal evolution of long-range spatio-temporal representations as well as retain 3D features with residual connections. In some embodiments, unique residual 4D blocks are used to perform long-range hierarchical modeling, including modeling long-range spatio-temporal dependency. In some embodiments, residual 4D blocks utilize residual connections to ensure both long-term and short-term representations can be learned jointly. The video-level training and inference details will be further discussed in connection with various figures.

Advantageously, the disclosed system is able to perform video recognition tasks more accurately based on video-level temporal evolution of spatio-temporal features. Further, the disclosed system is able to model both short-term and long-term temporal structures, (e.g., based on a unique design of residual 4D block). In various embodiments, improved video recognition power is achieved via video-level 4D convolutional neural networks that model the evolution of long-range spatio-temporal representations with 4D convolutions, and preserve 3D spatio-temporal representations with residual connections.

Experiments were conducted on various video recognition benchmarks, where the disclosed system achieved outstanding results. For example, the disclosed technologies significantly surpass previous video-level learning models on both appearance-dominated video recognition benchmark and motion-dominated video recognition benchmark. Further, the disclosed technologies not only achieved very competitive performance on these benchmarks but also obtained evident performance improvement over their 3D counterparts. For example, the disclosed system surpasses various 3D CNN systems by a large margin.

As discussed previously, the disclosed technologies provide a general and flexible framework for video-level representation learning. Accordingly, the disclosed technologies may be used in various practical applications to detect reportable actions in a video, such as shrinkage-related actions conducted by a shoplifter near a point of sale (POS), irregular or defect operations made by a robot or a person near an assembly line, or other types of reportable actions defined in respective practical applications.

Having briefly described an overview of aspects of the technologies described herein, schematic representation illustrating exemplary actions in a video are described in connection with FIG. 1.

An action in a video consists of many consecutive frames. Depending on the type of action to be observed, an action may include a few specific key elements or observations. By way of example, one type of action related to shrinkage is shoplifting. To identify a typical shoplifting action, one key observation is the subject attempts to conceal a product, and another key observation is the subject attempts to take the concealed product out of the store without payment. For the concealment, it is also advantageous to recognize the actual product and where it was concealed. In some embodiments, video recognition is configured to be product-oriented action recognition, instead of traditional person-oriented action recognition.

However, shoplifting has many different species. For example, some shoplifters may carry a product out without even conceal it. In this case, it is important to maintain an unbroken observation of the subject in relation to the observation scope, which could be the whole store or a specific area in the store, (e.g., a department, an aisle, a camera zone, etc.) Here, one key observation is about the subject entering the observation scope, and another key observation is about the subject leaving the observation scope. For instance, by comparing a large red handbag carried out by a customer at the exit with the small yellow handbag carried in by the customer at the entrance, an opinion may be formed regarding whether there is a reportable action related to the handbag.

In various embodiments, different levels of observation scopes may be configured for different purposes. Using shoplifting as an example, one level may be set up at the store level, in which the disclosed system is to track whereabouts of a subject, and particularly to make observations of the subject at the entrance, at the checkout area, and at the exit. Another level may be set up at the aisle or shelf level, in which the system is to observe how the subject selects merchandise, and particularly to make observations of what products have been selected and whereabouts of those selected products. Another level may be set up at the POS level, in which the system is to observe how the subject checks out the products, and particularly to make observations of any irregular checkout actions, such as any missed scans. Other observation scopes may be configured for other purposes.

In this example, sequence 110 includes a sequence of frames reflecting a reportable action for concealing a product. From left to right, frame 112 illustrates that the subject enters the observation scope, which covers a particular shelf with various merchandizes. Next, frame 114 illustrates that the subject picks up a product. Next, frame 116 illustrates that the subject conceals the product in a handbag. The disclosed system here is adapted to recognize this reportable action based on video-level temporal evolution of spatio-temporal features in sequence 110, such as the whereabouts of the product and its spatio-temporal relationship with the subject and other objects detected in the video. As discussed in connection with other figures, video-level 4D convolutional neural networks may be used to model the evolution of long-range spatio-temporal representations with 4D convolutions in some embodiments.

In contrast, sequence 120 includes another sequence of frames reflecting a regular (thus non-reportable) shopping action. From left to right, frame 122 illustrates that the subject picks up a product. Next, frame 124 illustrates that the subject studies the product. Next, frame 126 illustrates that the subject places the product into a shopping cart. Similarly, the disclosed system here can recognize this non-reportable action based on video-level temporal evolution of spatio-temporal features in sequence 120.

Figure 2:
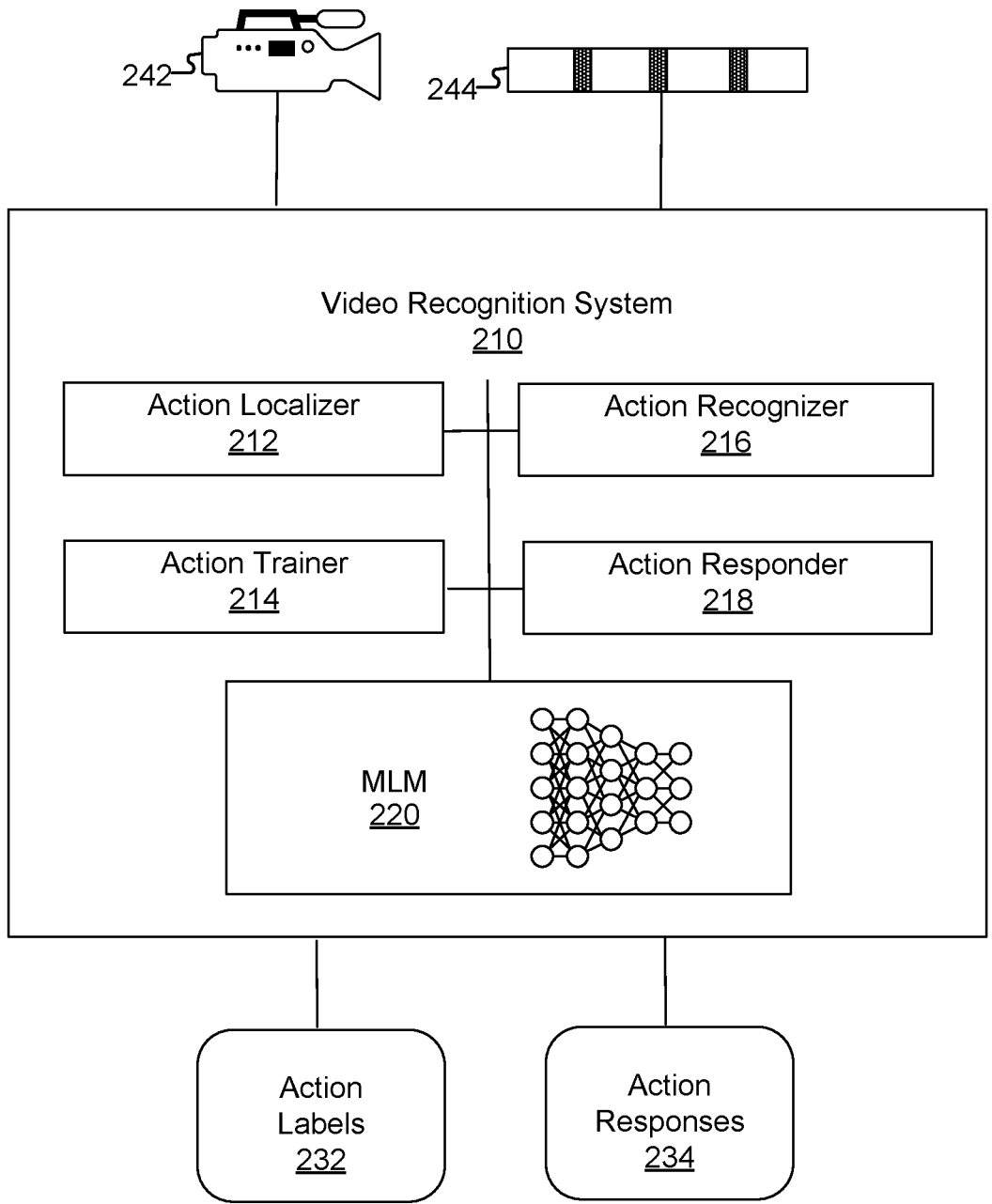
FIG. 2 is a block diagram of an exemplary video recognition system, in accordance with at least one aspect of the technologies described herein.

Referring to FIG. 2, an exemplary video recognition system 210 is shown for implementing at least one aspect of the disclosed technologies. This video recognition system is merely one example of a suitable computing environment and is not intended to suggest any limitation as to the scope of use or functionality of aspects of the technologies described herein. Neither should this video recognition system be interpreted as having any dependency or requirement relating to any one component nor any combination of components illustrated.

Video recognition system 210 may retrieve video 244 from a storage media or receive a video from video camera 242 directly. Further, video recognition system 210 can recognize various actions in the video and classify respective actions based on action labels 232, which are determined based on the specific application. In some embodiments, action labels 232 includes binary labels at the top level, (e.g., reportable vs. non-reportable, irregular vs. regular, above a threshold vs. not above the threshold, etc.) In some embodiments, action labels 232 includes further labels at additional levels. For example, in a shrinkage detection application, additional labels for the reportable actions may include different types of reportable actions, such as abuse, fraud, theft, vandalism, waste, or other misconduct. For fraud, different types of fraud actions (e.g., ticket switch) may be added to action labels 232. Similarly, for theft, different types of theft actions (e.g., concealment, open carry, etc.) may be added to action labels 232.

Based on the one or more action labels assigned to a detected action in the video, video recognition system 210 can invoke various action response 234. In some embodiments, in response to detecting a reportable action, the system is to generate a message. The warning message may include information of the reportable action. Information of the reportable actions may include the one or more action labels. Information of the reportable actions may include one or more representative images, such as those images illustrating the key observations related to the reportable action, for example, frame 116 in sequence 110 as discussed in connection with FIG. 1. Information of the reportable actions may include the video clip of the reportable action, for example, sequence 110 in FIG. 1.

The message may be distributed to one or more designated devices, for example, a monitoring device accessible to a loss prevention staff, a mobile device accessible to a store clerk, or a computing device accessible to the subject in the video. By way of example, the message of a reportable action may be displayed to the subject (e.g., via the checkout machine) during the check-out process or distributed to a device or an account of the subject registered in video recognition system 210 in real-time or near real-time. In this way, the subject may self-correct mistakes, (e.g., to check-out the product in the handbag, as illustrated in FIG. 1). Otherwise, the loss prevention staff may intervene at an appropriate time to apply appropriate corrections.

In other embodiments, action response 234 may include invoking various physical signals. In one embodiment, video recognition system 210 is to activate a warning light or prompt a voice message near the subject of the action. For instance, returning to FIG. 1, the disclose system can activate a warning light on or near the shelf. Alternatively, the disclose system can activate a warning light on the shopping cart. Similarly, the disclose system can prompt a voice message prompting the subject of the reportable action. In some embodiments, video recognition system 210 may invoke various types of physical signals during the checkout process, such as a warning light or siren at the checkout machine, a voice prompt from the checkout machine, or even other actions to pause or stop the checkout process.

Advantageously, when video recognition system 210 is used in a loss prevention application, it automates various video recognition tasks, so store personnel can effectively prevent or mitigate shrinkage without hiring loss prevention personnel or at least can reduce resources spent in loss prevention. Further, shrinkage-related actions can be deterred or at least discouraged.

In addition to other components not shown in FIG. 2, video recognition system 210 includes action localizer 212, action trainer 214, action recognizer 216, action responder 218, and machine learning module (MLM) 220, operatively coupled with each other. In video recognition system 210, action localizer 212 is generally adapted to localize actions in an untrimmed video using either temporal action localization techniques or spatio-temporal localization techniques, as videos in various applications are usually unconstrained and contain multiple action instances in background scenes.

In some embodiments, a temporal sliding window approach may be adopted, where each window is considered as an action candidate subject to classification. In some embodiments, action localizer 212 uses key observation or evidences in the untrimmed video and temporally localize actions based on the key observations, (e.g., by using the key observations as temporal annotations or temporal boundaries in the video). For example, in connection with FIG. 1, the observation scope may be set up to cover a particular shelf with various products. An entry and an exit point of a person in relation to the observation scope may form the key observations to localize a natural action from the video. As another example, action localizer 212 may focus on the key observations with a product, such as when the product is moved from the shelf. In various embodiments, neural networks may be used for temporal action localization.

In some embodiments, spatio-temporal localization techniques are used to localize actions in space and time simultaneously. Based on object detection techniques and tracking techniques, regions of interest (ROI) in each frame may be detected, and sequences of bounding boxes of such ROI may be outputted. Similarly, neural networks may be used for spatio-temporal localization. In one embodiment, spatio-temporal localization is achieved with a weakly supervised setting. For example, unsupervised segmentation techniques may be used to segment the video based on the elementary structure of the video. Next, CNNs may be used to extract RGB features from respective video segments. Next, multiple instance learning techniques may be employed to classify each video segment, thus to achieve spatio-temporal action detection.

Action recognizer 216 is generally adapted to recognize various actions in a video. In some embodiments, action recognizer 216 is to recognize an action based on the temporal evolution of spatio-temporal features in the video via a 4D convolutional operation, which will be further discussed in connection with other figures.

Action trainer 214 is generally adapted to train MLM 220 with training data, so action localizer 212 can use MLM 220 to localize actions in an untrimmed video, and action recognizer 216 can recognize actions in a video.

Action responder 218 is generally adapted to generate various responses based on the recognized action and the specific practical application. For example, various responses as discussed in connection with action responses 234 previously may be implemented with a practical application for loss prevention.

To perform various functions, (e.g., RGB-based video recognition), video recognition system 210 may use various machine learning models, (e.g., implemented via MLM 220), which may include one or more neural networks in some embodiments. As discussed previously, existing 3D CNNs take a short-term snippet as input, without considering the evolution of 3D spatio-temporal features for video-level representation.

In various embodiments, MLM 220 may use novel video-level 4D convolutional neural networks for video action recognition. For the first time, specially designed 4D convolutions are used for RGB-based video recognition in various embodiments. MLM 220 is designed to model 3D spatio-temporal features globally in a higher dimension setting. In various embodiments as discussed in FIG. 3 and FIG. 4, MLM 220 uses novel residual 4D blocks to transform 3D CNNs into 4D CNNs for learning long-range interactions of 3D features, resulting in a "time of time" video-level representation.

MLM 220 may use various neural networks. As used herein, a neural network comprises at least three operational layers. The three layers can include an input layer, a hidden layer, and an output layer. Each layer comprises neurons. The input layer neurons pass data to neurons in the hidden layer. Neurons in the hidden layer pass data to neurons in the output layer. The output layer then produces a classification. Different types of layers and networks connect neurons in different ways.

Every neuron has weights, an activation function that defines the output of the neuron given an input (including the weights), and an output. The weights are the adjustable parameters that cause a network to produce a correct output. The weights are adjusted during training. Once trained, the weight associated with a given neuron can remain fixed. The other data passing between neurons can change in response to a given input (e.g., image).

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

A CNN may include any number of layers. The objective of one type of layers (e.g., Convolutional, Relu, and Pool) is to extract features of the input volume, while the objective of another type of layers (e.g., fully connected (FC) and Softmax) is to classify based on the extracted features. An input layer may hold values associated with an instance. For example, when the instance is an image(s), the input layer may hold values representative of the raw pixel values of the image(s) as a volume (e.g., a width, W, a height, H, and color channels, C (e.g., RGB), such as W×H×C), and/or a batch size, B.

One or more layers in the CNN may include convolutional layers. The convolutional layers may compute the output of neurons that are connected to local regions in an input layer (e.g., the input layer), each neuron computing a dot product between their weights and a small region they are connected to in the input volume. In a convolutional process, a filter, a kernel, or a feature detector includes a small matrix used for features detection. Convolved features, activation maps, or feature maps are the output volume formed by sliding the filter over the image and computing the dot product. An exemplary result of a convolutional layer may be another volume, with one of the dimensions based on the number of filters applied (e.g., the width, the height, and the number of filters, F, such as W×H×F, if F were the number of filters).

One or more of the layers may include a rectified linear unit (ReLU) layer. The ReLU layer(s) may apply an elementwise activation function, such as the max (0, x), thresholding at zero, for example, which turns negative values to zeros (thresholding at zero). The resulting volume of a ReLU layer may be the same as the volume of the input of the ReLU layer. This layer does not change the size of the volume, and there are no hyperparameters.

One or more of the layers may include a pool or pooling layer. A pooling layer performs a function to reduce the spatial dimensions of the input and control overfitting. There are different functions, such as Max pooling, average pooling, or L2-norm pooling. In some embodiments, max pooling is used, which only takes the most important part (e.g., the value of the brightest pixel) of the input volume. By way of example, a pooling layer may perform a down-sampling operation along the spatial dimensions (e.g., the height and the width), which may result in a smaller volume than the input of the pooling layer (e.g., 16×16×12 from the 32×32×12 input volume). In some embodiments, the convolutional network may not include any pooling layers. Instead, strided convolutional layers may be used in place of pooling layers.

One or more of the layers may include a fully connected (FC) layer. A FC layer connects every neuron in one layer to every neuron in another layer. The last FC layer normally uses an activation function (e.g., Softmax) for classifying the generated features of the input volume into various classes based on the training dataset. The resulting volume may be 1×1×number of classes.

Further, calculating the length or magnitude of vectors is often required either directly as a regularization method in machine learning, or as part of broader vector or matrix operations. The length of the vector is referred to as the vector norm or the vector's magnitude. The L1 norm is calculated as the sum of the absolute values of the vector. The L2 norm is calculated as the square root of the sum of the squared vector values. The max norm is calculated as the maximum vector values.

As discussed previously, some of the layers may include parameters (e.g., weights and/or biases), such as a convolutional layer, while others may not, such as the ReLU layers and pooling layers, for example. In various embodiments, the parameters may be learned or updated during training. Further, some of the layers may include additional hyperparameters (e.g., learning rate, stride, epochs, kernel size, number of filters, type of pooling for pooling layers, etc.), such as a convolutional layer or a pooling layer, while other layers may not, such as a ReLU layer. Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

Although input layers, convolutional layers, pooling layers, ReLU layers, and fully connected layers are discussed herein, this is not intended to be limiting. For example, additional or alternative layers, such as normalization layers, Softmax layers, and/or other layer types, may be used in a CNN.

Different orders and layers in a CNN may be used depending on the embodiment. For example, when video recognition system 210 is used in practical applications for loss prevention (e.g., with emphasis on product-oriented action recognition), there may be one order and one combination of layers; whereas when video recognition system 210 is used in practical applications for crime prevention in public areas (e.g., with emphasis on person-oriented action recognition), there may be another order and another combination of layers. In other words, the layers and their order in a CNN may vary without departing from the scope of this disclosure.

Although many examples are described herein with respect to using neural networks, and specifically convolutional neural networks, this is not intended to be limiting. For example, and without limitation, MLM 220 may include any type of machine learning models, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

Video recognition system 210 is merely one example of a suitable computing environment and is not intended to suggest any limitation as to the scope of use or functionality of aspects of the technologies described herein. Neither should this system be interpreted as having any dependency or requirement relating to any one component nor any combination of components illustrated.

It should be understood that this arrangement of various components in video recognition system 210 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Figure 6:
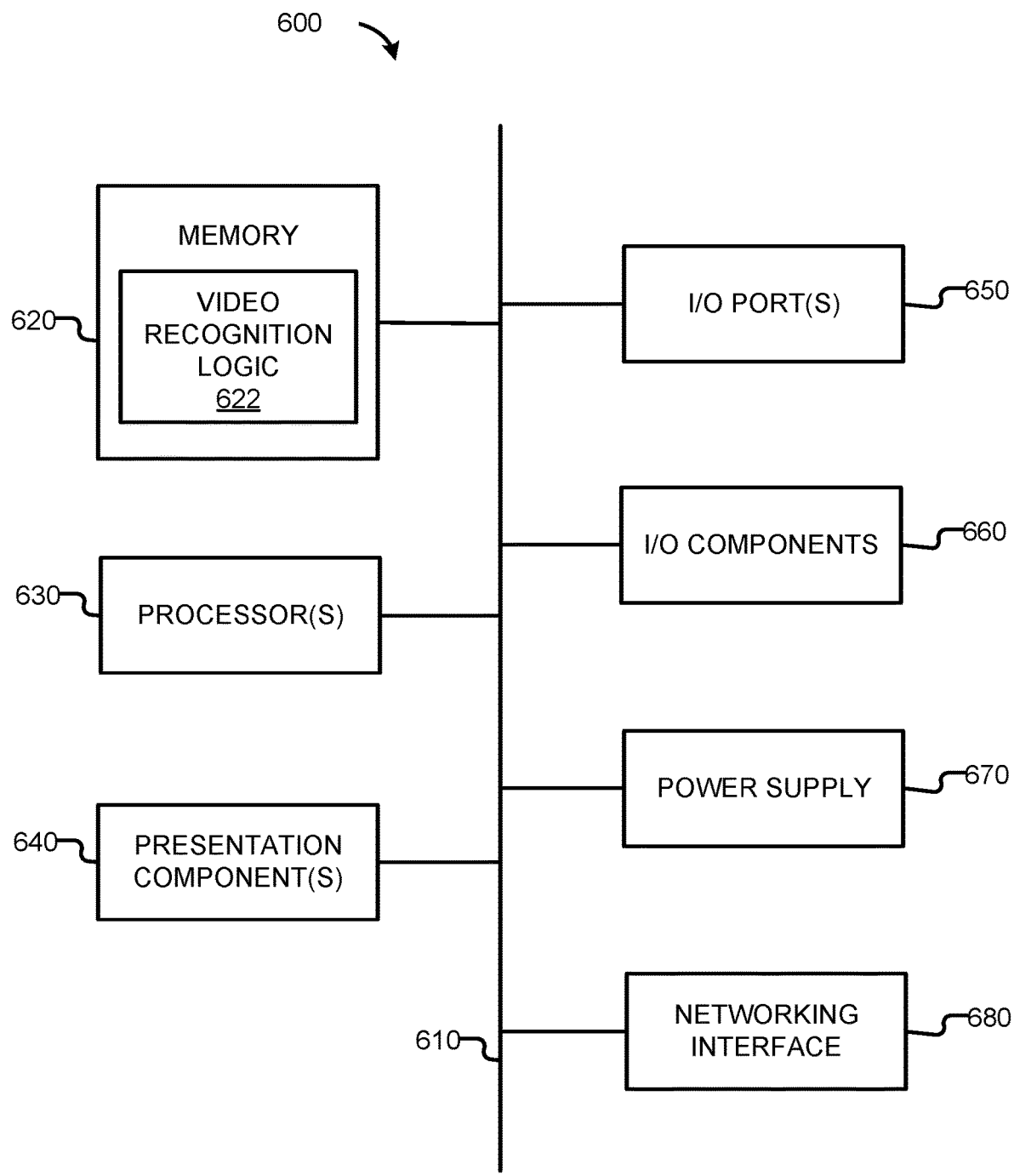
FIG. 6 is a block diagram of an exemplary computing environment suitable for use in implementing various aspects of the technologies described herein.

It should be understood that each of the components shown in video recognition system 210 may be implemented on any type of computing devices, such as computing device 600 described in FIG. 6. Further, each of the components may communicate with various external devices via a network, which may include, without limitation, a local area network (LAN) or a wide area network (WAN).

Figure 3:
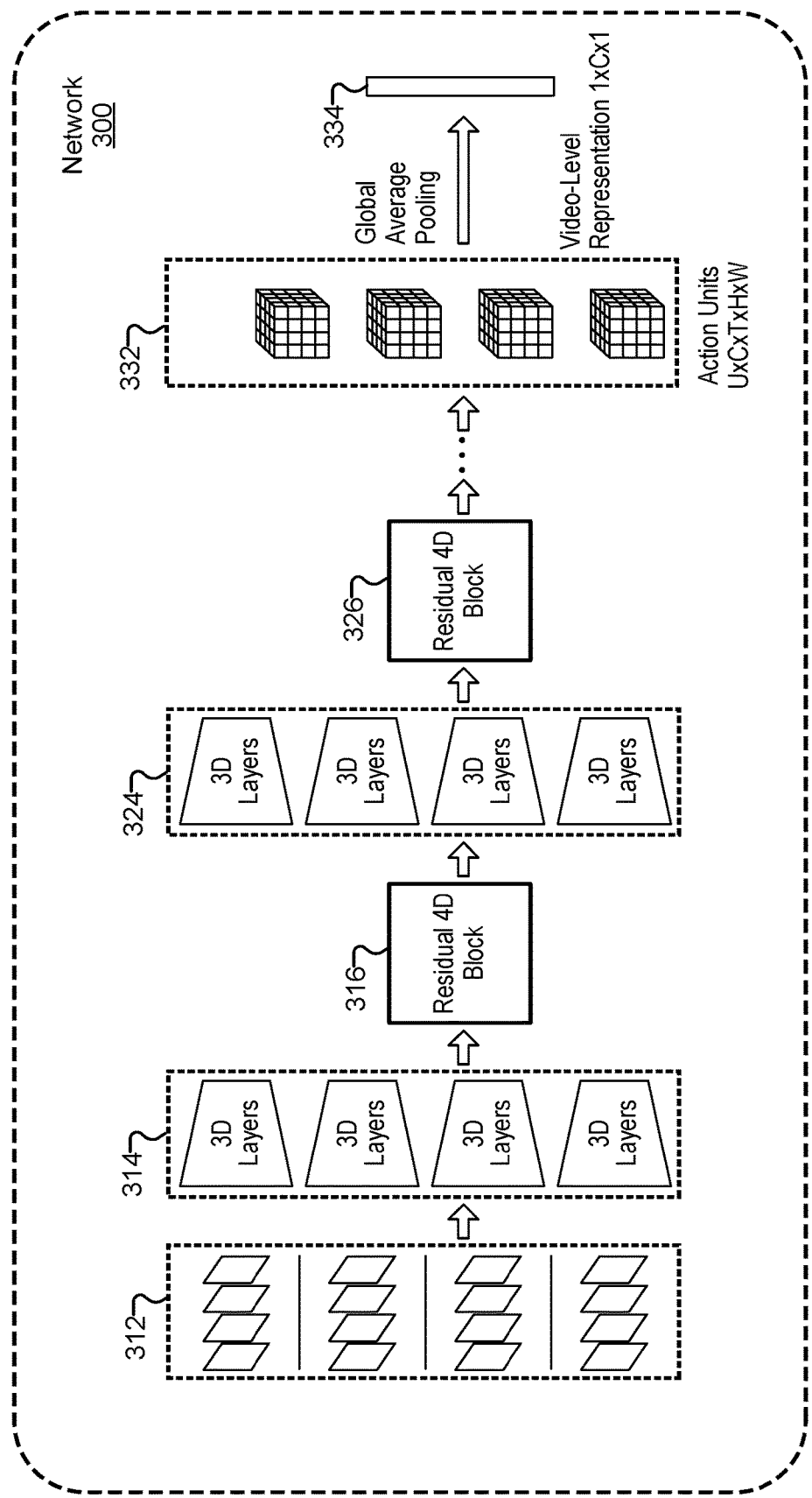
FIG. 3 is a schematic representation illustrating an exemplary system with 4D convolutional operations, in accordance with at least one aspect of the technologies described herein.

Referring now to FIG. 3, a schematic representation is provided illustrating an exemplary system with 4D convolutional operations, which is referenced generally as network 300. In various embodiments, network 300 is implemented with CNNs.

In various embodiments, network 300 uses 4D convolutions for learning spatio-temporal interactions in a video. 3D convolutional kernels have been proposed to model short-term spatio-temporal features. However, the receptive fields of 3D kernels are often limited due to the small sizes of kernels, and pooling operations are often applied to enlarge the receptive fields, resulting in significant information loss. Instead, network 300 uses 4D convolutions to model both short-term and long-term spatio-temporal representations simultaneously. Network 300 can be trained quickly to better model long-range spatio-temporal interactions with the disclosed 4D convolutional operations.

Formally, the input to 4D convolutions may be denoted as a tensor V of size (C, U, T, H, W), where C is number of channel; U is the number of action units (the fourth dimension in the 4D convolution); T, H, and W are temporal length, height and width of the action units, respectively. Note for simplicity, the batch dimension is omitted here. Further, a pixel at position (u, t, h, w) of the $j^{th}$ channel in the output may be denoted as $o_j^{uthw}$. An 4D convolutional operation can be formulated as shown in Eq. 1, where $b_j$ is the bias term; c is one of the $C_{in}$ input channels of the feature maps from the input tensor V; S×P×Q×R is the shape of 4D convolutional kernel; $W_{jc}^{spqr}$ is the weight at the position (s, p, q, r) of the kernel, corresponding to the $c^{th}$ channel of the input feature maps and $j^{th}$ channel of the output feature maps.

$$o_j^{uthw} = b_j + \sum_c^{C_{in}} \sum_{s=0}^{S-1} \sum_{p=0}^{P-1} \sum_{q=0}^{Q-1} \sum_{r=0}^{R-1} W_{jc}^{spqr} v_c^{(u+s)(t+p)(h+q)(w+r)} \quad \text{Eq. 1}$$

Action units (AU) 312 is the input to an 4D convolutional operation in network 300. AU 312 reflects a unique video-level sampling strategy in network 300. To model meaningful video-level representation for action recognition, the input needs to cover the holistic duration of a given video, and at the same time preserve short-term action details. A naive approach is to use every frame of the video for implementing per-frame training of the network. However, this naive approach is impractical due to the limit of computation resource and time. Instead, in various embodiments, the whole video is uniformly divided into U sections, and a snippet (a.k.a. an action unit) from each section is randomly selected to represent a short-term action pattern. With this video-level sampling strategy, AU 312 with the Uaction units may be used to represent the holistic action in a video.

During the training phase, for training network 300, the convolutional part of network 300 is composed of 3D convolutional layers (e.g., layers 314 and layers 324) and residual 4D blocks (e.g., R4DB 316 and R4DB 326). In this embodiment, each action unit from AU 312 is trained individually and in parallel in the 3D convolutional layers (e.g., layers 314 and layers 324). All 3D layers in layers 314 may share the same parameters. These individual 3D features computed from each action units are then fed to a residual 4D block for modelling the long-term temporal evolution of the consecutive action units. This part of the 4D convolutional operation may be continued with multiple sets of 3D layers and residual 4D blocks until transformed action units 332 is achieved. Finally, global average pooling may be applied on the sequence of all transformed action units to form a video-level representation 334, (e.g., in the form of 1×C×1).

During the inference phrase, a new video-level inference method, which is shown in "Inference Process" below, may be used, where the 3D convolutional layers are denoted as $N_{3D}$, followed by the residual 4D blocks, $N_{4D}$. Further, given U action units $\{A_1, A_2, \ldots, A_U\}$ of a video, $U_{train}$ is denoted as the number of action units for training, and $U_{infer}$ is denoted as the number of action units for inference. $U_{train}$ and $U_{infer}$ are usually different because computation resource is limited in training, but high accuracy is desired in inference.

| Inference Process | |
|---|---|
| Network | The network structure is divided into two sub-networks by the first 4D Block, namely $N_{3D}$ and $N_{4D}$. |
| Input | $U_{infer}$ action units from a holistic video: $\{A_1, A_2, \ldots, A_{U_{infer}}\}$. |
| Output | The video-level prediction. |
| Inference Process: | |

-continued

Inference Process

1. Feed $\{A_1, A_2, \ldots, A_{U_{infer}}\}$ into $N_{3D}$, generate intermediate feature maps for each unit $\{F_1, F_2, \ldots, F_{U_{infer}}\}$, $F_i \in \mathbb{R}^{C \times T \times H \times W}$;

2. Equally divide the $U_{infer}$ intermediate features into $U_{train}$ sections. Select one unit from each section $F_{sec_i}$ and combine these $U_{train}$ units into a video-level intermediate representation $$F^{video} = (F_{sec_1}, F_{sec_2}, \ldots, F_{sec_{U_{train}}}).$$

These video-level representations form a new set $F_1^{video}, F_2^{video}, \ldots, F_{U_{combined}}^{video}$, where $$U_{combined} = (U_{infer} / U_{train})^{U_{train}}, F_i^{video} \in \mathbb{R}^{U_{train} \times C \times T \times H \times 2};$$

3. Each $F_i^{video}$ in set $F_1^{video}, F_2^{video}, \ldots, F_{U_{combined}}^{video}$ are processed by $N_{4D}$ to form a prediction score set $\{P_1, P_2, \ldots, P_{U_{combined}}\}$; and
4. $\{P_1, P_2, \ldots, P_{U_{combined}}\}$ are averaged to give the final video-level prediction.

Regarding the position and number of 4D blocks ($N_{3D}$ and $N_{4D}$), in some experiments to investigate the performance of the disclosed technologies by using one 3×3×1×1 4D block at res3, res4 or res5, a higher accuracy can be obtained by applying the 4D block at res3 or res4, indicating that the merged long-short term features of the 4D block need to be further refined by 3D convolutions to generate more meaningful representation. Furthermore, inserting one 4D block at res3 and another 4D block at res4 can achieve very high accuracy.

Regarding the number of action units (i.e., U), different values of hyperparameter U are tried in some experiments for training. In an experiment, one 3×3×1×1 residual 4D block is inserted at the end of res4 of ResNet18, and the experiment indicates U does not have a significant impact on the performance. This experiment may suggest the disclosed video-level feature learning technologies are robust against the number of short-term units. Further, when an action does not contain many stages, increasing U may have no additional performance benefit. Additionally, a larger number of action units means the fourth dimension is increasing in the 4D convolutional operation, which needs a larger 4D kernel to cover the long-range evolution of spatio-temporal representation. In conclusion, a reasonable small hyperparameter U may suffice for many types of practical applications of the disclosed technologies.

To compare to other modern systems on a benchmark (Mini-Kinetics), the disclosed residual 4D blocks are added into every other 3D residual blocks in res3 and res4. With much fewer frames utilized during training and inference, the disclosed system achieves a higher accuracy than all reported results on this benchmark, which further verifies the effectiveness of the disclosed technologies.

Figure 4:
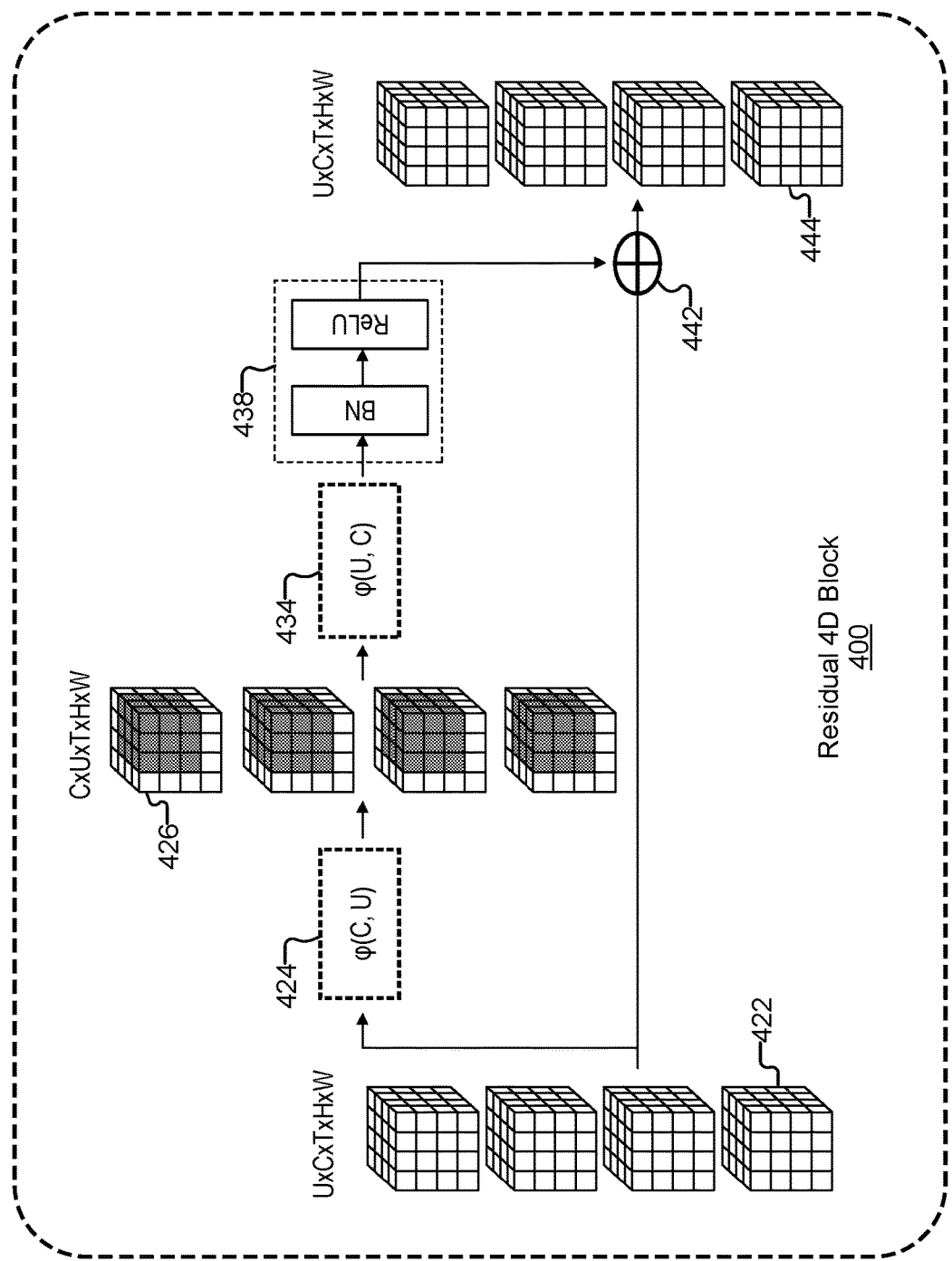
FIG. 4 is a schematic representation illustrating an exemplary residual 4D block, in accordance with at least one aspect of the technologies described herein.

Having discussed network 300, which includes R4DB 316 and R4DB 326, now referring to FIG. 4, a schematic representation is provided illustrating an exemplary residual 4D block, which is designated generally as R4DB 400. R4DB 400 is adapted to conduct a 4D convolution in a residual structure, such both short-term 3D features and long-term evolution of the spatio-temporal representations may be aggregated together for video-level action recognition. In various embodiments, R4DB 400 is used to incorporate 4D convolutions into existing 3D CNN architectures for action recognition. After incorporating R4DB 400, an existing 3D CNN model may be transformed into a 4D CNN model.

To formulate R4DB 400, a permutation function is provided in Eq. 2, which permutes dimension $d_i$ and $d_1$ of a tensor $M \in \mathbb{R}^{d_1 \times \cdots \times d_n}$. As formulated by Eq. 3, $F_{4D}(X; W_{4D})$ is a 4D convolutional operation. For this 4D convolution, input 422 is denoted as $X_{3D}$, and output 444 is denoted as $Y_{3D}$, where $X_{3D}, Y_{3D} \in \mathbb{R}^{U \times C \times T \times H \times W}$, and U is merged into batch dimension so that $X_{3D}, Y_{3D}$ can be directly processed by standard 3D CNNs.

In block 424, $\varphi$ is employed to permute the dimensions of $X_{3D}$ from U×C×T×H×W to C×U×T×H×W, so the permuted $X_{3D}$ can be processed by 4D convolutions at block 426 with a 4D kernel. Different forms of 4D convolution kernels in block 426 will be further discussed herein.

The output of 4D convolution at block 426 may then be permuted back via $\varphi$ to 3D form at block 434, so the output dimensions are consistent with $X_{3D}$. In some embodiments, batch normalization and ReLU activation in block 438 may then be applied. Next, the output from block 438 and input 422 ($X_{3D}$) are transformed at operation 442 to produce output 444 ($Y_{3D}$). In some embodiments, operation 442 includes an elementwise addition. In this way, 3D spatio-temporal representations between two 3D convolutional layers is preserved with a residual connection in R4DB 400.

$$\varphi(d_i, d_j): M^{d_1 \times \cdots \times d_i \times \cdots \times d_j \times \cdots \times d_n} \mapsto M^{d_1 \times \cdots \times d_j \times \cdots \times d_n} \quad \text{Eq. 2}$$

$$Y_{3D} = X_{3D} + \varphi_{(U,C)}(F_{4D}(\varphi_{(C,U)}(X_{3D}); W_{4D})) \quad \text{Eq 3}$$

For different practical applications, different 3D CNNs can be transformed to 4D CNNs by integrating R4DB 400. Further, in some embodiments, better performance may be obtained by applying 2D convolutions at lower layers and 3D convolutions at higher layers of the 3D CNNs.

Back to different forms of 4D convolution kernels, compared to 3D kernels with a shape of (T, H, W), 4D kernels additionally use the number of action units (U) as the fourth dimension. Channel and batch dimensions are omitted for clarity here. In other embodiments, Channel and batch dimensions may be added as additional dimensions. In connection with Eq. 1, the shape of a 4D convolutional kernel is now (S×P×Q×R). In various embodiments, 4D convolution kernels can use any one of the three typical forms: k×1×1×1, k×k×1×1, and k×k×k×k. Convolutional operations are linear, and the sequence of sum operations in Eq. 1 are exchangeable. Thus, 4D convolutions operations may be implemented by 3D convolutions based on Eq. 4. Specifically, the expression in the parentheses can be implemented by 3D convolutions. Advantageously, R4DB 400 may be added to an existing 3D CNN architecture to implement the disclosed 4D convolution operation.

$$o_j^{uthw} = b_j + \sum_{s=0}^{S-1} \left( \sum_{c}^{C_{in}} \sum_{p=0}^{P-1} \sum_{q=0}^{Q-1} \sum_{r=0}^{R-1} w_{jc}^{spqr} v_c^{(u+s)(t+p)(h+q)(w+r)} \right) \quad \text{Eq. 4}$$

With the 4D convolutional kernel, the short-term 3D features of an individual action unit and long-term temporal evolution of multiple action units can be modeled simultaneously in the 4D space. Compared to 3D convolutions, the disclosed 4D convolutions are able to model videos in a more meaningful 4D feature space such that complicated interactions of long-range 3D spatio-temporal representations may be learned.

4D convolutions introduce more parameters and add computation cost. For example, a 4D convolutional kernel of k×k×k×k employs k times more parameters than a 3D kernel of k×k×k. Instead of k×k×k×k kernels, k×k×1×1 and k×1× 1×1 kernels may be used for reducing parameters and avoiding the risk of overfitting. In another experiment, by setting k as 3 for simplicity and applying a single 4D block at the end of res4 in I3D-S ResNet18, the 3×3×3×3 kernel achieves the highest performance. However, considering the trade-off different 4D kernels, the k×k×1×1 kernel may serve as a reasonable candidate in many practical applications of the disclosed technologies.

Figure 5:
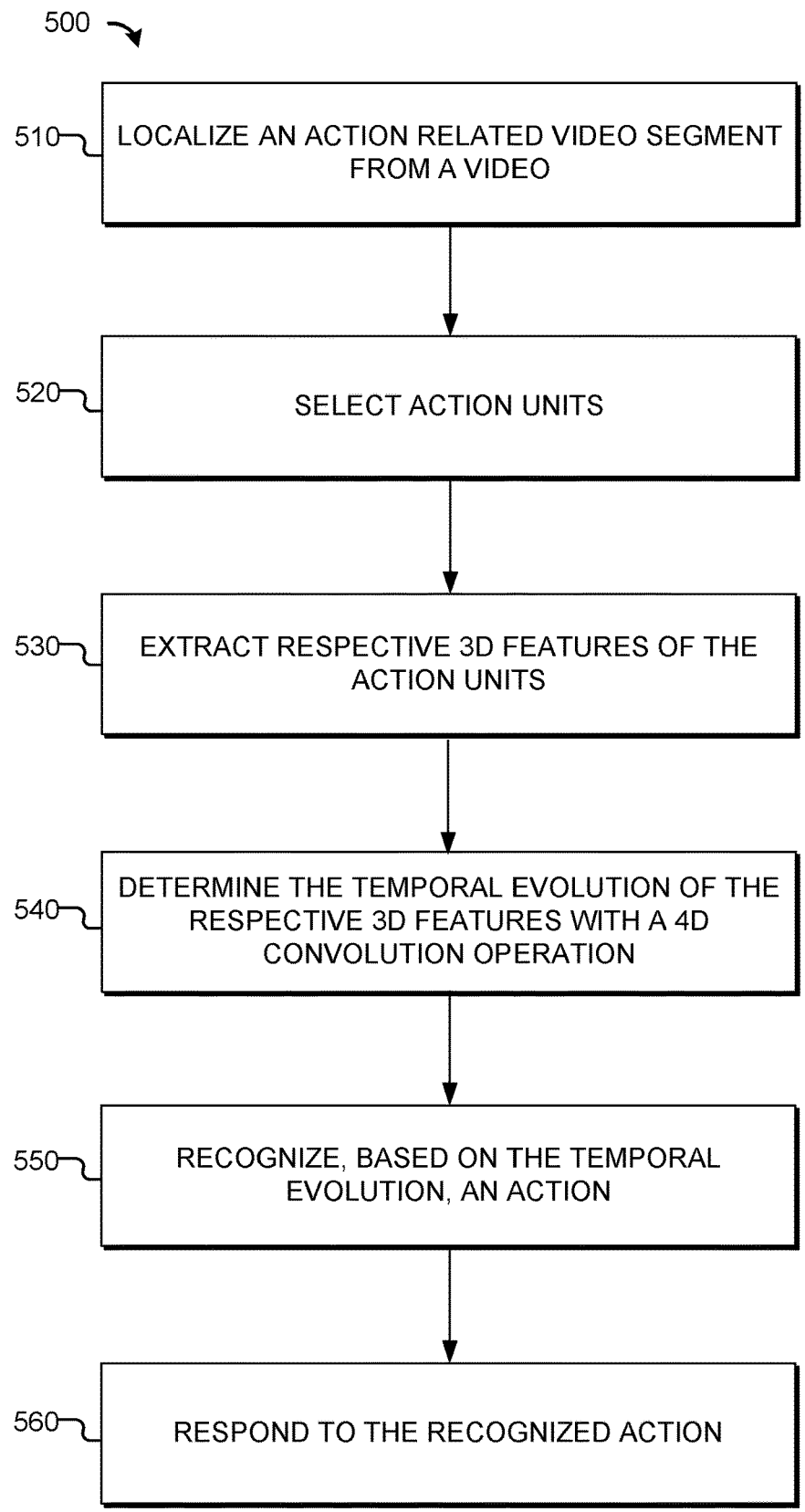
FIG. 5 is a flow diagram illustrating an exemplary process of video recognition, in accordance with at least one aspect of the technologies described herein.

Referring now to FIG. 5, a flow diagram is provided that illustrates an exemplary process 500 for video recognition, (e.g., performed by video recognition system 210 of FIG. 2).

At block 510, the process is to localize an action related video segment from a video, (e.g., by action localizer 212 of FIG. 2). As discussed in connection with FIG. 2, many techniques may be used for automatic action localization. Each video segment may be analyzed for action recognition.

At block 520, the process is to select action units from the video segment, (e.g., by action recognizer 216 of FIG. 2). In various embodiments, the video segment may be uniformly divided into sections, respective action unit (e.g., a number of frames) may be randomly selected from each section. These action units may be combined (e.g., concatenated in their natural order) to represent the holistic action in the video segment.

At block 530, the process is to extract respective 3D features of the action units, (e.g., by action trainer 214 and/or action recognizer 216 via MLM 220 of FIG. 2). As discussed in connection with FIG. 3, this operation may be carried out by 3D CNNs in layers 314 or layers 324. The neural layers at the same level may share the same parameters. As different action units are to be processed equally, the extracted 3D features become more comparable.

At block 540, the process is to determine the temporal evolution of the respective 3D features with a 4D convolutional operation, (e.g., by action trainer 214 and/or action recognizer 216 of FIG. 2 via MLM 220 of FIG. 2). As discussed in connection with FIG. 3, this operation may be carried out via R4DB 316 or R4DB 326 in FIG. 3. As mentioned previously, a 4D convolution block is composed of respective 3D convolutional layers and a residual 4D block. In a 4D convolutional operation, each action unit is trained individually and in parallel in the 3D convolutional layers, which share the same parameters. These individual 3D features computed from each action units are then fed to the residual 4D block for modelling the long-term temporal evolution of the consecutive action units. Finally, global average pooling is applied on the sequence of all action units to form a video-level representation.

At block 550, the process is to recognize an action based on the temporal evolution of the respective 3D features, (e.g., by action trainer 214 and/or action recognizer 216 via MLM 220 of FIG. 2). In various embodiments, action recognition is based on the video-level representation formed in block 540.

At block 560, the process is to respond to the recognized action, (e.g., by action responder 218 of FIG. 2). In various embodiments, the process will only respond to a reportable action. The scope of the reportable actions may be defined for respective practical applications. In a loss prevention application, shrinkage-related actions are reportable. In response to a reportable action being recognized, a message may be generated and distributed to one or more designated devices. The message may include information of the reportable action, including one or more representative images related to the reportable action, one or more representative action units related to the reportable action, or even the whole video segment related to the reportable action.

Accordingly, we have described various aspects of the disclosed technologies for video recognition. Each block in process 500 and other processes described herein comprises a computing process that may be performed using any combination of hardware, firmware, or software. For instance, various functions may be carried out by a processor executing instructions stored in memory. The processes may also be embodied as computer-usable instructions stored on computer storage media or devices. The process may be provided by an application, a service, or a combination thereof.

It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way and, in fact, the steps/blocks may occur in a variety of different sequences within embodiments hereof. Such variations and combinations thereof are also contemplated to be within the scope of embodiments of this disclosure.

Referring to FIG. 6, an exemplary operating environment for implementing various aspects of the technologies described herein is shown and designated generally as computing device 600. Computing device 600 is but one example of a suitable computing environment and is not intended to suggest any limitation as to the scope of use of the technologies described herein. Neither should the computing device 600 be interpreted as having any dependency or requirement relating to any one or combination of components illustrated.

The technologies described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote-processing devices that are connected through a communications network.

With continued reference to FIG. 6, computing device 600 includes a bus 610 that directly or indirectly couples the following devices: memory 620, processors 630, presentation components 640, input/output (I/O) ports 650, I/O components 660, and an illustrative power supply 670. Bus 610 may include an address bus, data bus, or a combination thereof. Although the various blocks of FIG. 6 are shown with lines for the sake of clarity, in reality, delineating various components is not so clear and, metaphorically, the lines would more accurately be grey and fuzzy. For example, one may consider a presentation component such as a display device to be an I/O component. The inventors hereof recognize that such is the nature of the art and reiterate that the diagram of FIG. 6 is merely illustrative of an exemplary computing device that can be used in connection with different aspects of the technologies described herein. Distinction is not made between such categories as "workstation," "server," "laptop," "handheld device," etc., as all are contemplated within the scope of FIG. 6 and refers to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information, such as computer-readable instructions, data structures, program modules, or other data.

Computer storage media includes RAM, ROM, EEPROM, flash memory or other memory technologies, CD-ROM, digital versatile disks (DVD), or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal, such as a carrier wave or other transport mechanism, and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 620 includes computer storage media in the form of volatile and/or nonvolatile memory. The memory 620 may be removable, non-removable, or a combination thereof. Exemplary memory includes solid-state memory, hard drives, optical-disc drives, etc. Computing device 600 includes processors 630 that read data from various entities, such as bus 610, memory 620, or I/O components 660. Presentation component(s) 640 present data indications to a user or other device. Exemplary presentation components 640 include a display device, speaker, printing component, vibrating component, etc. I/O ports 650 allow computing device 600 to be logically coupled to other devices, including I/O components 660, some of which may be built in.

In various embodiments, memory 620 includes, in particular, temporal and persistent copies of video recognition logic 622. Video recognition logic 622 includes instructions that, when executed by processor 630, result in computing device 600 performing functions, such as, but not limited to, process 500 or other processes discussed herein. In various embodiments, video recognition logic 622 includes instructions that, when executed by processors 630, result in computing device 600 performing various functions associated with, but not limited to, various components in connection with video recognition system 210 in FIG. 2; various components in connection with network 300 in FIG. 3; and various components in connection with residual 4D block 400 in FIG. 4.

In some embodiments, processors 630 may be packed together with video recognition logic 622. In some embodiments, processors 630 may be packaged together with video recognition logic 622 to form a System in Package (SiP). In some embodiments, processors 630 can be integrated on the same die with video recognition logic 622. In some embodiments, processors 630 can be integrated on the same die with video recognition logic 622 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 630 may be direct or via a coupling utilizing a serial port, parallel port, and/or other interface and/or system bus known in the art. Furthermore, the digitizer input component may be a component separate from an output component, such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 660 include various graphical user interface (GUI), which allow users to interact with computing device 600 through graphical elements or visual indicators. Interactions with a GUI usually are performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, a same GUI may have different presentations on different computing devices, such as based on the different graphical processing units (GPUs) or the various characteristics of the display.

Computing device 600 may include networking interface 680. The networking interface 680 includes a network interface controller (NIC) that transmits and receives data. The networking interface 680 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 680 may include a wireless terminal adapted to receive communications and media over various wireless networks. Computing device 600 may communicate with other devices via the networking interface 680 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, there is no intention to limit the technologies described herein to the specific forms disclosed, but on the contrary, the intention is to cover all modifications, alternative constructions, and equivalents falling within the spirit and scope of the technologies described herein.

Lastly, by way of example, and not limitation, the following examples are provided to illustrate various embodiments, in accordance with at least one aspect of the disclosed technologies.

Examples in the first group comprises a method, a computer system adapted to perform the method, or a computer storage device storing computer-useable instructions that cause a computer system to perform the method.

Example 1 in the first group includes operations for modeling, based on a 4D convolutional operation in a neural network, a temporal evolution of spatio-temporal features of a video; recognizing, based on the temporal evolution of spatio-temporal features, an action in the video; and classifying the video based on the action.

Example 2 may include any subject matter of examples in the first group, and further includes operations for dividing the video into a plurality of sections; and selecting respective action units from each of the plurality of sections.

Example 3 may include any subject matter of examples in the first group, and further include operations for dividing the video into the plurality of sections with a uniform length; and selecting one or more equal counts of action units with a predetermined length from each of the plurality of sections.

Example 4 may include any subject matter of examples in the first group, and further includes operations for using a 4D convolutional operation to capture local and global 3D spatio-temporal features of the respective action units.

Example 5 may include any subject matter of examples in the first group, and further includes operations for providing the respective action units in parallel to respective 3D convolutional layers with weight sharing; outputting respective 3D features from the respective 3D convolutional layers to a residual 4D block; and modeling a part of the temporal evolution of spatio-temporal features of the video based on the 4D convolutional operation with the residual 4D block.

Example 6 may include any subject matter of examples in the first group, and further includes operations for pooling convolutional features of the respective action units to form a video-level representation of the video.

Example 7 may include any subject matter of examples in the first group, and further includes operations for implementing the 4D convolutional operation based on a summation, in a dimension of action unit, of a plurality of action-unit-based 3D convolutional operations that use a temporal length, a height, and a width of an action unit at a channel.

Example 8 may include any subject matter of examples in the first group, and further includes operations for classifying the video into a reportable type; and generating a message in response to the video being classified into the behavioral type.

Examples in the second group comprises a method, a computer system adapted to perform the method, or a computer storage device storing computer-useable instructions that cause a computer system to perform the method.

Example 9 in the second group includes operations for modeling, based on a residual 4D block in a neural network, both short-range and long-range temporal structural features in a video; recognizing, based on the short-range and long-range temporal structural features, an action in the video; and causing display of a message in response to the action being recognized.

Example 10 may include any subject matter of examples in the second group, and further includes operations for preserving 3D spatio-temporal representations between two 3D convolutional layers in the neural network with a residual connection in the residual 4D block.

Example 11 may include any subject matter of examples in the second group, and further specify that the short-range temporal structural features comprises 3D features of an action unit; the long-range temporal structural features comprises evolution features of respective 3D features of a plurality of action units; and the action unit is a selected segment of the video.

Example 12 may include any subject matter of examples in the second group, and further includes operations for aggregating, via the residual 4D block, 3D features of the action unit and the evolution features of respective 3D features of the plurality of action units, for video-level action recognition.

Example 13 may include any subject matter of examples in the second group, and further includes operations for modeling the evolution features of respective 3D features of the plurality of action units via a plurality of concatenated 4D convolution blocks, one 4D convolution block including a plurality of 3D convolutional layers followed by the residual 4D block.

Example 14 may include any subject matter of examples in the second group, and further includes operations for forming an input to the residual 4D block as a tensor with a first dimension of a channel, a second dimension of an action unit, a third dimension of a temporal length of the action unit, a fourth dimension of a height of the action unit, and a fifth dimension of a width of the action unit, wherein the action unit is a selected segment of the video.

Example 15 may include any subject matter of examples in the second group, and further includes operations for forming an input to the residual 4D block as a tensor with a first dimension of a channel, a second dimension of an action unit, a third dimension of a temporal length of the action unit, a fourth dimension of a height of the action unit, and a fifth dimension of a width of the action unit, wherein the action unit is a selected segment of the video.

Examples in the third group comprises a method, a computer system adapted to perform the method, or a computer storage device storing computer-useable instructions that cause a computer system to perform the method.

Example 16 in the third group includes operations to identify, via an action localization operation, a section of a video corresponding to an action; determine, via a 4D convolutional operation in a neural network, a temporal evolution feature of spatio-temporal features in the section of the video; classify, based on the temporal evolution of spatio-temporal features, the action as a type of reportable action; and cause display of a message based on the action being classified as the type of reportable action.

Example 17 may include any subject matter of examples in the third group, and further includes operations to jointly capture local and global 3D spatio-temporal features of the section of the video based on the 4D convolutional operation.

Example 18 may include any subject matter of examples in the third group, and further includes operations to implement the 4D convolutional operation based on a summation, in a dimension of action unit, of a plurality of action-unitbased 3D convolutional operations, wherein an action unit represents a random segment of the section of the video.

Example 19 may include any subject matter of examples in the third group, and further includes operations to implement a 4D kernel in the 4D convolutional operation, wherein the 4D kernel comprises a first dimension of an action unit, a second dimension of a temporal length of the action unit, a third dimension of a height of the action unit, and a fourth dimension of a width of the action unit, wherein the action unit comprises a selected segment of the section of the video.

Example 20 may include any subject matter of examples in the third group, and further includes operations to extract the section of the video from the video; and wirelessly transmit the section of the video in the message to a remote device.

What is claimed is:

1. A computer-implemented method for video recognition, comprising:
   modeling, based on a residual four-dimensional (4D) block in a neural network, both short-range temporal structural features and long-range temporal structural features in a video;
   preserving three-dimensional (3D) spatio-temporal representations between two 3D convolutional layers in the neural network with a residual connection in the residual 4D block;
   recognizing, based on the short-range temporal structural features and the long-range temporal structural features, an action in the video; and
   causing display of a message in response to the action being recognized.

2. The method of claim 1, wherein the long-range temporal structural features comprises evolution features of respective 3D features of a plurality of action units.

3. The method of claim 2, wherein the short-range temporal structural features comprises 3D features of an action unit, the action unit including a plurality of frames selected from the video.

4. The method of claim 3, further comprising: aggregating, via the residual 4D block, 3D features of the action unit and the evolution features of respective 3D features of the plurality of action units, for video-level action recognition.

5. The method of claim 3, further comprising: modeling the evolution features of respective 3D features of the plurality of action units via a plurality of concatenated 4D convolution blocks, one 4D convolution block including a plurality of 3D convolutional layers followed by the residual 4D block.

6. The method of claim 1, further comprising:
   forming an input to the residual 4D block as a tensor with a first dimension of a channel, a second dimension of an action unit, a third dimension of a temporal length of the action unit, a fourth dimension of a height of the action unit, and a fifth dimension of a width of the action unit, wherein the action unit is a selected segment of the video.

7. The method of claim 1, further comprising: implementing a 4D convolutional operation with the residual 4D block based on a summation, in a dimension of action unit, of a plurality of action-unit-based 3D convolutional operations that use a temporal length, a height, and a width of an action unit at a channel.

8. The method of claim 1, further comprising:
   classifying, based on the action, the video into a reportable type; and
   generating the message in response to the video being classified into the reportable type.

9. A non-transitory computer-readable storage device encoded with instructions that, when executed, cause one or more processors of a computing system to perform operations of video recognition, comprising:
   modeling, based on a residual four-dimensional (4D) block in a neural network, both short-range temporal structural features and long-range temporal structural features in a video;
   preserving three-dimensional (3D) spatio-temporal representations between two 3D convolutional layers in the neural network with a residual connection in the residual 4D block;
   recognizing, based on the short-range temporal structural features and the long-range temporal structural features, an action in the video; and
   causing display of a message in response to the action being recognized.

10. The computer-readable storage device of claim 9, wherein the long-range temporal structural features comprises evolution features of respective 3D features of a plurality of action units.

11. The computer-readable storage device of claim 10, wherein the short-range temporal structural features comprises 3D features of an action unit, the action unit including a plurality of frames selected from the video.

12. The computer-readable storage device of claim 11, wherein the instructions that, when executed, cause the one or more processors to perform further operations comprising:
   aggregating, via the residual 4D block, 3D features of the action unit and the evolution features of respective 3D features of the plurality of action units, for video-level action recognition.

13. The computer-readable storage device of claim 11, wherein the instructions that, when executed, cause the one or more processors to perform further operations comprising:
   modeling the evolution features of respective 3D features of the plurality of action units via a plurality of concatenated 4D convolution blocks, one 4D convolution block including a plurality of 3D convolutional layers followed by the residual 4D block.

14. The computer-readable storage device of claim 9, wherein the instructions that, when executed, cause the one or more processors to perform further operations comprising:
   forming an input to the residual 4D block as a tensor with a first dimension of a channel, a second dimension of an action unit, a third dimension of a temporal length of the action unit, a fourth dimension of a height of the action unit, and a fifth dimension of a width of the action unit, wherein the action unit is a selected segment of the video.

15. The computer-readable storage device of claim 9, wherein the instructions that, when executed, further cause the one or more processors to perform operations comprising:
   implementing a 4D convolutional operation with the residual 4D block based on a summation, in a dimension of action unit, of a plurality of action-unit-based 3D convolutional operations that use a temporal length, a height, and a width of an action unit at a channel.

16. A system for RGB-based video recognition, comprising: a processor; and
 a memory having instructions stored thereon, wherein the instructions, when executed by the processor, cause the processor to:
 identify, via an action localization operation, a section of a video corresponding to an action;
 determine, via a four-dimensional (4D) convolutional operation in a neural network, a temporal evolution of spatio-temporal features in the section of the video;
 classify, based on the temporal evolution of spatio-temporal features, the action as a type of reportable action, wherein the type of reportable action comprises a type of theft;
 cause display of a message based on the action being classified as the type of reportable action;
 extract the section of the video from the video; and
 wirelessly transmit the section of the video in the message to a remote device, wherein the message comprises a description of the type of theft.

17. The system of claim 16, wherein the instructions, when executed by the processor, further cause the processor to:
 jointly capture local and global three-dimensional (3D) spatio-temporal features of the section of the video based on the 4D convolutional operation.

18. The system of claim 16, wherein the instructions, when executed by the processor, further cause the processor to:
 implement the 4D convolutional operation based on a summation, in a dimension of action unit, of a plurality of action-unit-based 3D convolutional operations, wherein an action unit represents a random segment of the section of the video.

19. The system of claim 16, wherein the instructions, when executed by the processor, further cause the processor to:
 generate the message.

20. The system of claim 16, wherein the type of reportable action comprises a type of theft, and the message comprises a description of the type of theft, wherein the instructions, when executed by the processor, further cause the processor to:
 extract the section of the video from the video; and
 wirelessly transmit the section of the video in the message to a remote device.

* * * * *